United States Patent [19]
Gruaz et al.

[11] Patent Number: 5,459,463
[45] Date of Patent: Oct. 17, 1995

[54] DEVICE FOR LOCATING AN OBJECT SITUATED CLOSE TO A DETECTION AREA AND A TRANSPARENT KEYBOARD USING SAID DEVICE

[75] Inventors: Daniel Gruaz, Montigny le Bretonneux; Claude Marchal, Garancieres, both of France

[73] Assignee: Sextant Avionique, France

[21] Appl. No.: 958,464

[22] Filed: Oct. 8, 1992

Related U.S. Application Data

[63] Continuation of Ser. No. 706,489, May 28, 1991, abandoned.

[30]     Foreign Application Priority Data

May 25, 1990 [FR] France ................................ 90 06820

[51] Int. Cl.[6] .................................................. G08C 21/00
[52] U.S. Cl. ............................. 341/33; 345/173; 178/18; 178/19
[58] Field of Search ................................. 178/18, 19, 20; 341/22, 26, 33; 345/157, 158, 173

[56]     References Cited

U.S. PATENT DOCUMENTS

| | | | |
|---|---|---|---|
| 4,550,221 | 10/1985 | Mabusth | 178/18 |
| 4,686,332 | 8/1987 | Greanias et al. | 178/19 |
| 5,016,008 | 5/1991 | Gruaz et al. | 341/33 |

Primary Examiner—John K. Peng
Assistant Examiner—Andrew Hill
Attorney, Agent, or Firm—William A. Drucker

[57]     ABSTRACT

A device is disclosed for locating an object situated close to a detection area and a transparent keyboard using said device. This device comprises a set of detection zones connected so as to form lines which extend parallel to each other and to a detection area, a second set of zones connected to each other so as to form columns which extend perpendicularly to the lines, at a small distance therefrom, a scanning device which applies an electric signal to the lines and columns and which identifies the lines and columns subject to a signal variation and means for determining the position of the object to be detected as a function of the lines and columns on which the signal variations have been detected.

16 Claims, 2 Drawing Sheets

DEVICE FOR LOCATING AN OBJECT
SITUATED CLOSE TO A DETECTION AREA
AND A TRANSPARENT KEYBOARD USING
SAID DEVICE

This application is a continuation of application Ser. No. 07/706,489, filed May 28, 1991, abandoned.

BACKGROUND OF THE INVENTION

1. Field of the Invention

The present invention relates to a device for locating an object situated close to a detection area.

It applies particularly, but not exclusively, to the construction of a flat transparent keyboard which can be placed on the display area of a display system such, for example, as a cathode ray tube, a liquid crystal display LCD, etc. . . .

Generally, numerous devices of this kind have been proposed comprising a series of detection zones suitably distributed in the detection area and which are scanned successively by means able to identify and so locate the zone which, at a given moment, detects the presence of an object.

Such detection may take place from the measurement of the variation of an electric parameter associated with each zone. The location of the object is then obtained through identification of the zone concerned by said variation.

A drawback of the above mentioned devices is that they have a number of control points limited to the number of detection zones which it is possible to insert in the same detection area, so as to be compatible with the usual dimensions of an operator's finger and means used for avoiding several detection zones from being influenced at the same moment by the same finger of the operator.

2. Description of the Prior Art

To try to overcome this drawback, a multiplexed type detection device has been proposed, particularly by the patent U.S. Pat. No. 5,016,008 which claims the priority of the french parent patent FR 87 07323 filed on 25th May 1987, in the name of the Société Francaise d'Equipements pour la Navigation Aérienne (SFENA), in which the locating points consist in the center of gravity of a plurality of detection zones influenced at the same time by the finger of the operator, this center of gravity being defined by using, as weighting coefficient assigned to the center of each of these zones, the level of the variation of the parameter detected for this zone.

It has proved however that the resolution obtained with this solution, although very much better than the previously proposed solutions, is limited because of the number of connections required (at least one separate connection per detection zone).

Furthermore, the conventional solution consists in using multi-layer printed circuits, as described in said patent, which increases the number of detection zones, but which cannot be used for forming flat transparent keyboards. In fact, because of the multiplicity of zones and the electrically conducting connections as well as the relatively great thickness of the printed circuits, it is practically impossible to obtain a sufficiently transparent assembly.

SUMMARY OF THE INVENTION

An object of the invention is then more particularly to provide an extra flat locating device of very simple structure which, in the case where it is transparent, only causes a very slight attenuation of the light signal transmitted and which exhibits however high resolution with a higher number of control points than in known devices.

To attain this result, it provides a device for locating an object close to a detection area, characterized in that it comprises:

- a first set of detection zones connected to each other so as to form a multiplicity of lines independent of each other which extend parallel to each other over a first surface parallel to the detection area;
- a second set of detection zones connected to each other so as to form a multiplicity of columns independent of each other, which extend perpendicularly to said lines over a second surface, parallel to the first one and at a small distance therefrom;
- a scanning device which applies an electric signal to the lines and columns and which identifies the lines and columns for which a signal variation due to the proximity of the object whose position it is desired to determine, has been detected; and
- means for determining the position of the object as a function of the lines and columns on which signal variations have been detected.

Advantageously, the position of the object will be determined by the center of gravity of the influenced zone using, as weighting coefficient associated with each line and each column, a value representative of the variation of the signal detected on this line or this column.

BRIEF DESCRIPTION OF THE DRAWINGS

One embodiment of the invention will be described hereafter, by way of non limitative example, with reference to the accompanying drawings in which.

DESCRIPTION OF THE PREFERRED EMBODIMENT

In this example, keyboard 11 is in the form of a transparent plate, of small thickness, which may be applied on a substrate 12, possibly transparent, such for example as the display surface of a cathode ray tube.

Figure 2:
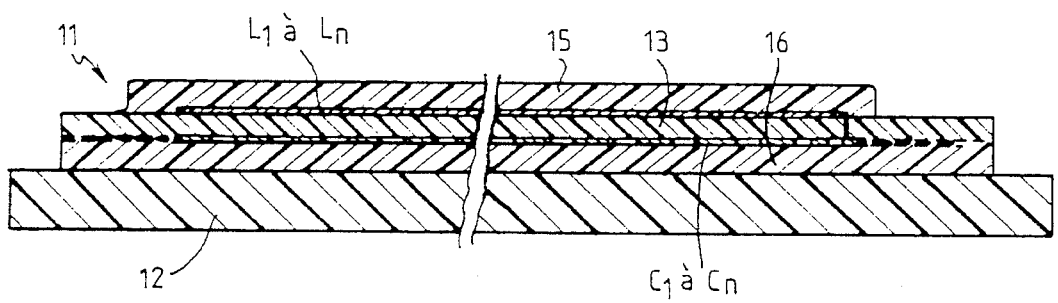
FIG. 2 is a schematic cross section of the transparent keyboard shown in FIG. 1.

As is clear from FIG. 2, this plate is formed of three electrically insulating transparent material layers, namely:

- a central layer 13 on both faces of which are disposed respectively, on the one hand, a first plurality of electrically conducting zones $P_1$, connected to each other so as to form a multiplicity of lines $L_1$ to $L_n$ parallel to each other and electrically insulated from each other and, on the other hand, a second plurality of electrically conducting transparent zones $P_2$, connected to each other so as to form a multiplicity of columns $C_1$ to $C_n$ perpendicular to said lines and electrically insulated from each other, and
- two electrically insulating protective layers 15, 16 applied respectively on the two faces of the central layer 13, which carry the metallizations.

The conducting zones $P_1$, $P_2$ as well as the connecting elements joining them together, consist of metal deposits whose thickness is sufficiently small for the transparency of the plate not to be significantly affected.

In this embodiment, zones $P_1$, $P_2$ have a square or diamond shape and the connecting elements consist of narrow rectilinear strips 17, 18 following the diagonal of zones $P_1$, $P_2$ to which they are connected (the connections are made at the level of the apices of zones $P_1$, $P_2$).

The conducting zones $P_1$, forming the lines $L_1$ to $L_n$, are staggered with respect to the conducting zones $P_2$ forming the columns $C_1$ to $C_n$, each of these zones $P_1$ being disposed inside a substantially hexagonal region defined by four adjacent zones $P_2$.

It will be noted that in this arrangement the intersections between lines $L_1$ to $L_n$ and columns $C_1$ to $C_n$ occur at the level of the connecting elements 17, 18 and, consequently, in very reduced regions and only affect to a very small extent the transparency properties of keyboard 11: in the major part of keyboard 11, the light rays will only pass through a single metallization layer. Furthermore, this configuration reduces to the strict minimum the dead regions between the different zones $P_1$ and $P_2$ as well as the capacities between these zones.

Lines $L_1$ to $L_n$ and columns $C_1$ to $C_n$ are connected to two respective electronic circuits each comprising:

- a switching circuit 17, 17' (for example of multiplexer type) driven by a processor 18 so as to apply to the lines $L_1$ to $L_n$ and the columns $C_1$ to $C_n$, via respective capacitors 19, 19', a periodic signal for example of a frequency of 4 MHz, generated by a generator 20;
- a detection circuit 21, 21' able to detect the variations of the signals applied to the lines and the columns, in synchronism with the switching circuits 17, 17', these circuits 21, 21' being driven by the processor 18 and transmitting thereto the information concerning the amplitude of said variations;
- a circuit for connection between the lines and the columns and the detection circuit 21, 21', this circuit comprising two diodes $D_1$, $D_2$—$D'_1$, $D'_2$ connecting each line L and each column C respectively to ground and to the detection circuit 21, 21', the diodes $D_1$, $D_2$ being disposed so as to conduct from ground to the detection circuit 21, 21'.

The operation of the above described device is then the following:

When an operator applies a finger on the external face of keyboard 11, the presence of the finger causes, by capacitive effect, a variation of the signal applied by its circuits 17, 17' to the conducting zones $P_1$, $P_2$ situated in the immediate vicinity of the finger.

These variations which affect lines $L_1$ to $L_n$ and columns $C_1$ to $C_n$ comprising the zones influenced by the finger are detected by the detection circuits 21, 21', which transmit to the processor 18 information relative to the number of each line (or column) influenced, as well as information about the amplitude of the variation of the signal applied to this line.

With this information, the processor 18 will be able to locate the position of the finger of the operator (locus of the intersections of the lines and columns influenced).

Figure 3:
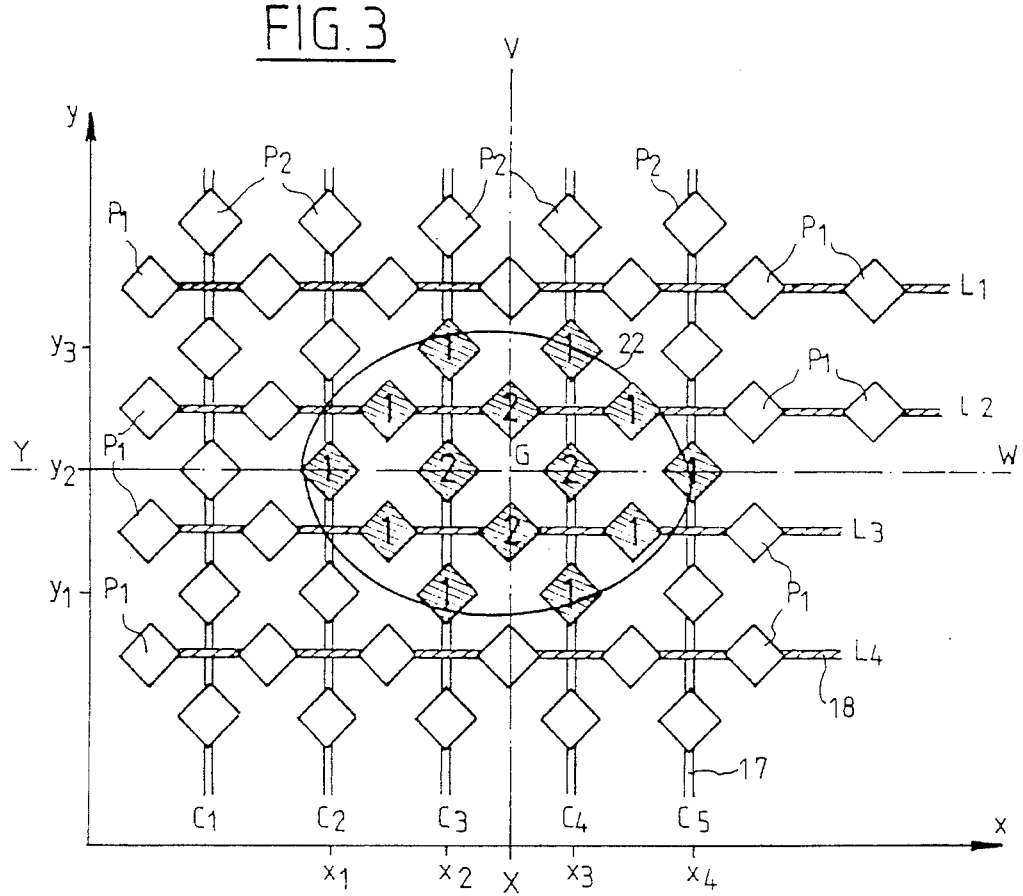
FIG. 3 is a schematic representation, on a larger scale, of the keyboard shown in FIG. 1, this representation illustrating one method of determining the position of the finger of the user on the keyboard.

The processor may further determine the position of a bearing point G corresponding substantially to the center of gravity of the region of the keyboard influenced by the finger, calculation of this position taking place as follows, with reference to FIG. 3.

Figure 1:
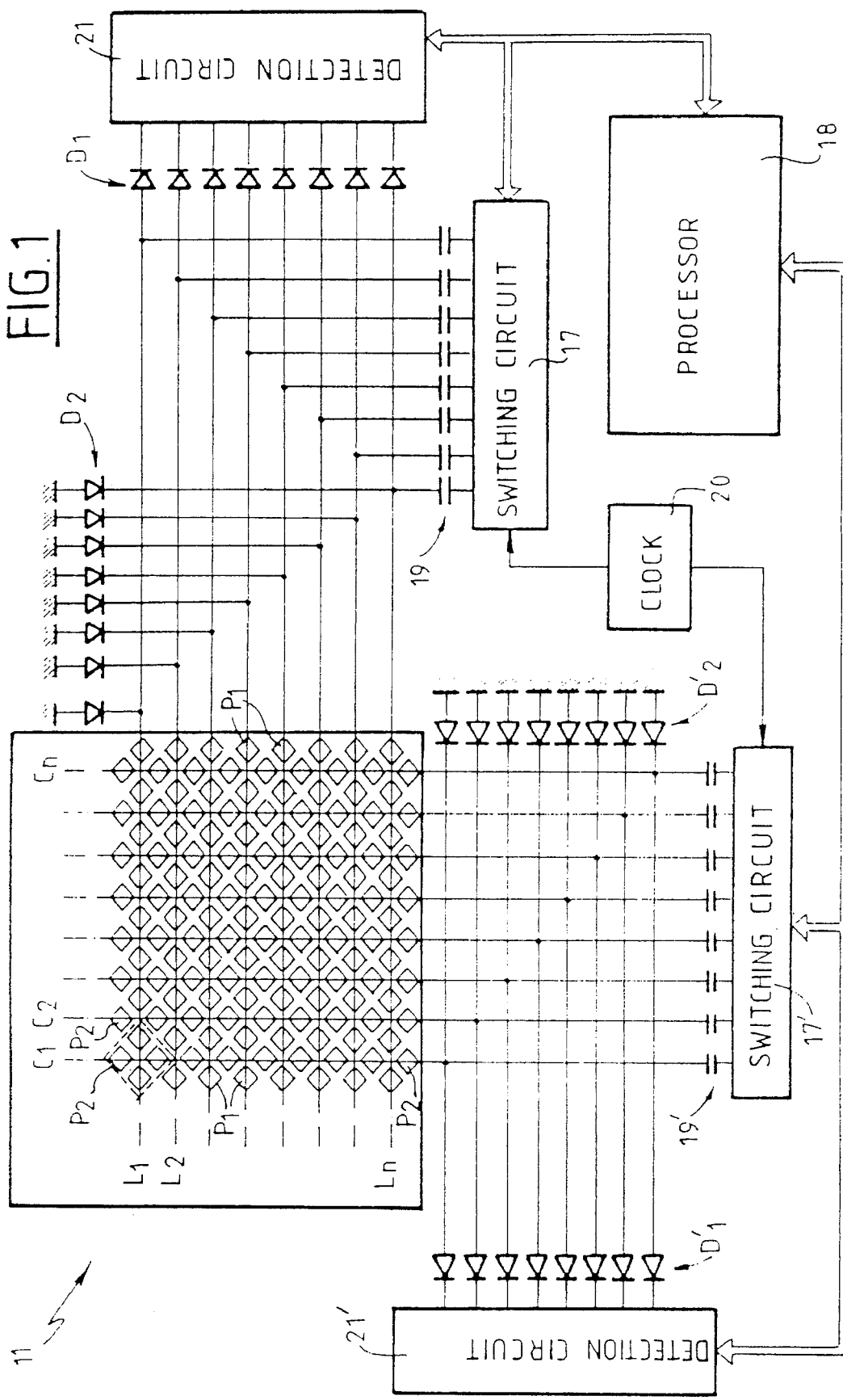
FIG. 1 is a diagrammatic representation showing a transparent keyboard according to the invention as well as the electronic circuits associated with this keyboard.

In this figure, the closed curve 22 indicates a region of the keyboard influenced by a finger of the operator. Inside this region, the conducting zones have been hatched and bear FIGS. 1, 2 which correspond to levels of influence of the finger on these zones, it being understood that such influence of the finger on the zones generates variations of the signal applied to the lines or the columns of the keyboard which are influenced, the influenced levels of the zones of the same line or of the same column being added together.

To determine the center of gravity G of the influenced zone, the computer determines the coordinates X, Y of the two axes V, W respectively parallel to the lines and columns which pass through this center of gravity G, using a formula of the type:

$$X \text{ or } Y = \frac{\sum\limits_{n=o}^{i} (x_n \text{ or } y_n) K_n}{\sum\limits_{n=o}^{i} K_n}$$

in which formula $x_n$ and $y_n$ represent respectively the abscissa and the ordinates of the lines and columns influenced and $K_n$ is the weighting coefficient assigned to each line and each column. For a given line (or column), the coefficient K will be equal to the sum of the influenced levels of the influenced zones of this line or this column. It will be obtained directly from the measurement of the variation of the signal applied to this line and to this column.

Knowing the coordinates x and y of the center of gravity, the processor may, for example, identify the key which includes this center of gravity and which may, for example, be represented by a light image displayed on the display surface of the cathode ray tube.

An important advantage of the above described transparent keyboard is that it makes it possible to obtain a number of detectable zones much greater than the number of lines and columns used.

Furthermore, with the matrix structure of the circuits of the keyboard, the electronic means and the connecting means for connecting the keyboard to these electronic means are considerably simplified.

in addition, for the reasons invoked above, the keyboard has good transparency and may be treated so as to have an anti-dazzle effect.

What is claimed is:

1. Device for locating an object having indifferent shape and size on a detection area, comprising:

an electrically insulating layer having a first face and a second face parallel to the detection area, a first set of electrically conducting detection zones connected to each other so as to form a multiplicity of lines independent of each other which extend parallel to each other on said first face, said lines crossing a first axis at respective first fixed points each having a determined position;

a second set of electrically conducting detection zones connected to each other so as to form a multiplicity of columns independent of each other which extend perpendicularly to said lines on said second face, said columns crossing a second axis at respective second fixed points each having a determined position, all said detection zones being shaped and spaced independently from the size and the shape of said object so that said object is influencing at least three lines and three columns;

a scanning device comprising means for applying an electric signal on said lines and said columns, means for measuring on each line and each column an amplitude of variation of said signal due to a presence of said object, and means for identifying at least three lines and three columns subjected to said variation of signal; and a computing device provided with: i) means for determining for each identified line a coefficient proportional to the amplitude measured on said identified line, ii) means for determining the position of a virtual line parallel to said lines and crossing the first axis at a point whose position corresponds to a weighted average of the position of the first fixed points of said identified lines weighted with their respective coefficients, iii) means for determining for each identified column a coefficient proportional to the amplitude measured on said identified column, and iv) means for determining the position of a virtual column parallel to said columns and crossing the second axis at a point whose position corresponds to a weighted average of the position of the second fixed points of said identified columns weighted with their respective coefficients, said virtual line and said virtual column intersecting in a point which locates said object.

2. The device as claimed in claim 1, wherein the detection zones belonging to the first set are separated from the detection zones of the second set by an insert layer made from an electrically insulating material.

3. The device as claimed in claim 2, wherein the insert layer carrying the lines and columns is covered with two protective layers made from an electrically insulating material.

4. The device as claimed in claim 3, wherein said detection zones and the connecting elements which join them together to form the lines and columns consist of deposits of conducting material sufficiently thin to be Transparent, and said intermediate layer and the protective layers are made from a transparent material.

5. The device as claimed in claim 1, wherein the conducting zones forming the lines are staggered with respect to the conducting zones forming the column.

6. The device as claimed in claim 1, wherein said zones have a square or diamond shape and the connecting elements which join these zones together consist of narrow rectilinear strips centered on the diagonal of the zones to which they are connected, the connections being made at the level of the apices of the zones.

7. The device as claimed in claim 2 wherein the conducting zones forming the lines are staggered with respect to the conducting zones forming the column.

8. The device as claimed in claim 3 wherein the conducting zones forming the lines are staggered with respect to the conducting zones forming the column.

9. The device as claimed in claim 4 wherein the conducting zones forming the lines are staggered with respect to the conducting zones forming the column.

10. The device as claimed in claim 2 wherein said zones have a square or diamond shape and the connecting elements which join these zones together consist of narrow rectilinear strips centered on the diagonal of the zones to which they are connected, the connections being made at the level of the apices of the zones.

11. The device as claimed in claim 3 wherein said zones have a square or diamond shape and the connecting elements which join these zones together consist of narrow rectilinear strips centered on the diagonal of the zones to which they are connected, the connections being made at the level of the apices of the zones.

12. The device as claimed in claim 4 wherein said zones have a square or diamond shape and the connecting elements which join these zones together consist of narrow rectilinear strips centered on the diagonal of the zones to which they are connected, the connections being made at the level of the apices of the zones.

13. The device as claimed in claim 5 wherein said zones have a square or diamond shape and the connecting elements which join these zones together consist of narrow rectilinear strips centered on the diagonal of the zones to which they are connected, the connections being made at the level of the apices of the zones.

14. The device as claimed in claim 7 wherein said zones have a square or diamond shape and the connecting elements which join these zones together consist of narrow rectilinear strips centered on the diagonal of the zones to which they are connected, the connections being made at the level of the apices of the zones.

15. The device as claimed in claim 8 wherein said zones have a square or diamond shape and the connecting elements which join these zones together consist of narrow rectilinear strips centered on the diagonal of the zones to which they are connected, the connections being made at the level of the apices of the zones.

16. The device as claimed in claim 9 wherein said zones have a square or diamond shape and the connecting elements which join these zones together consist of narrow rectilinear strips centered on the diagonal of the zones to which they are connected, the connections being made at the level of the apices of the zones.

* * * * *